United States Patent [19]

Suzuki et al.

[11] Patent Number: 4,647,169
[45] Date of Patent: Mar. 3, 1987

[54] MOTOR DRIVE DEVICE FOR CAMERA

[75] Inventors: Masayuki Suzuki; Masaharu Kawamura, both of Kanagawa, Japan

[73] Assignee: Canon Kabushiki Kaisha, Tokyo, Japan

[21] Appl. No.: 711,064

[22] Filed: Mar. 12, 1985

[30] Foreign Application Priority Data

Mar. 16, 1984 [JP] Japan ................................ 59-50490

[51] Int. Cl.⁴ ...................... G03B 1/00; B65H 23/198; F16H 5/42
[52] U.S. Cl. ................................ 354/173.1; 242/191; 226/40; 74/336 R
[58] Field of Search ................ 354/173.1, 173.11, 214; 74/878, 856, 336 R; 192/0.032, 0.033; 352/180–182; 226/24, 40, 42; 242/71.4, 71.5, 186, 191, 196, 75.5, 75.51, 75.52, 75.53

[56] References Cited

U.S. PATENT DOCUMENTS

| 2,981,121 | 4/1961 | Peras .................................. 74/336 X |
| 3,882,516 | 5/1975 | Ogiso et al. .................... 354/173.11 |
| 4,272,173 | 6/1981 | Iwashita et al. ............... 354/173.11 |
| 4,494,842 | 1/1985 | Kimura et al. ................. 354/173.11 |

Primary Examiner—William B. Perkey
Attorney, Agent, or Firm—Toren, McGeady and Goldberg

[57] ABSTRACT

A motor drive device for an operation of a camera such as film winding, etc. with a motor is arranged to detect the rotating speed of the motor and to shift, according to the rotating speed thus detected, the reduction ratio of a driving force transmitting gear train of a drive mechanism for transmitting the driving force of the motor to a load, so that the load can be adequately driven.

9 Claims, 4 Drawing Figures

FIG.2
FIG.4
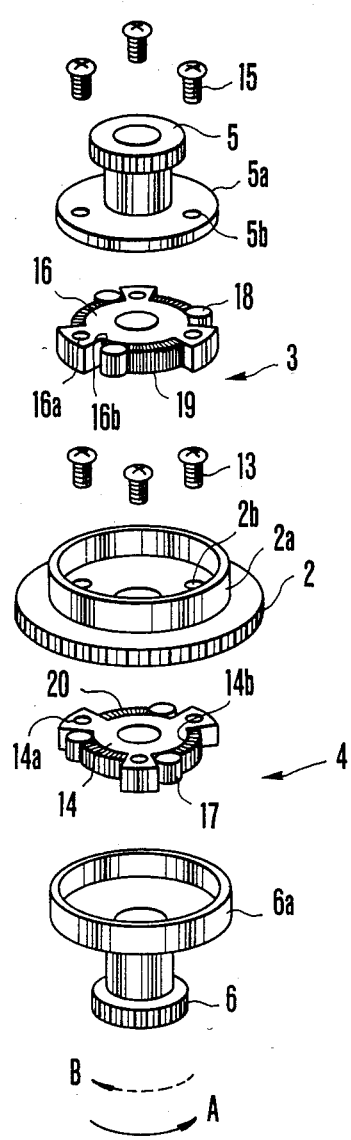
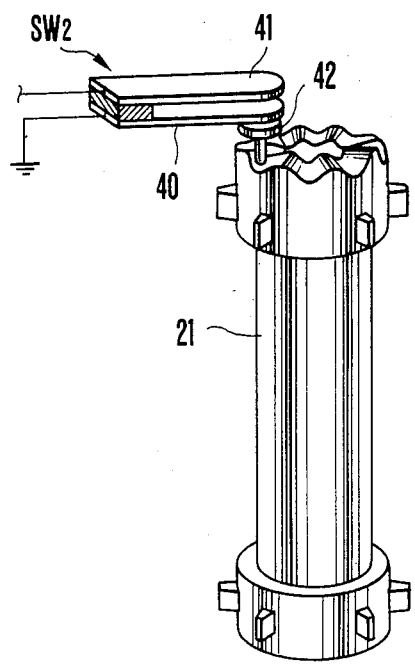

MOTOR DRIVE DEVICE FOR CAMERA

BACKGROUND OF THE INVENTION

1. Field of the Invention

This invention relates to an improvement in a motor drive device for a camera using a motor for at least one operation such as film winding, film rewinding and charging of a charge mechanism.

2. Description of the Prior Art

In the conventional motor drive device for a camera, the reduction ratio thereof has been set at a value which does not permit the use of a motor either at the maximum output point or at the maximum efficiency point thereof, because: With the reduction ratio set at a value enabling use of the motor at the maximum output point thereof, the length of time required for charging the camera can be shortened for normal photography. However, in this case, on the other hand, the number of rolls of film which can be fed decreases since the battery of the camera is discharged faster. Furthermore, under a low temperature condition, such as −20° C. or the like, the film load increases by 3 to 4 times as much as the load under normal temperatures and, when a manganese battery is used as the power source, the internal resistance thereof greatly increases to hinder the flow of current. Then, under such a condition, the output torque of the motor decreases making it difficult to start the motor. When the reduction ratio is set to permit use of the motor at the maximum efficiency point, a greater number of film rolls can be fed and the camera can be charged even in low temperatures. However, under normal temperatures film winding requires a longer period of time. This is a serious problem for a motor drive device which is required to wind up 5 to 6 photography frames of film per second. To avoid these problems, therefore, motor drive devices in general have the reduction ratio set at a value corresponding to a middle point between the maximum output point and the maximum efficiency point of the motor. However, the conventional arrangement, so to speak, impairs the above two advantages.

SUMMARY OF THE INVENTION

It is therefore an object of the present invention to provide a motor drive device for a camera which solves the above problems and is capable of automatically selecting an optimum reduction ratio between ratios for high and low speeds based on the photographing circumstances.

It is another object of this invention to provide a motor drive device wherein the above stated problems are solved with the driving efficiency of a drive system which transmits the driving force of a motor to a load varied based on the rotational frequency of the motor or the state of the load driving operation of the motor.

These and further objects and features of the invention will become apparent from the following detailed description of a preferred embodiment thereof taken in conjunction with the accompanying drawings.

SUMMARY OF THE INVENTION

To attain the first object, a preferred embodiment of this invention is provided with detecting means for detecting a signal representing the rotating speed of a motor and switch-over control means for controlling the motor by switching over between normal and reverse rotations thereof. In the event that the rotating speed of the motor becomes low, a driving gear train having a reduction ratio on the low speed side is selected by switching the rotating direction of the motor.

BRIEF DESCRIPTION OF THE DRAWINGS

FIG. 2 is an exploded view of a one-way clutch shown in FIG. 1.

FIG. 4 is an oblique view showing a sprocket and a switch which turns on and off as the sprocket rotates.

DETAILED DESCRIPTION OF THE PREFERRED EMBODIMENT

Details of this invention are described in the following embodiment.

Figure 1:
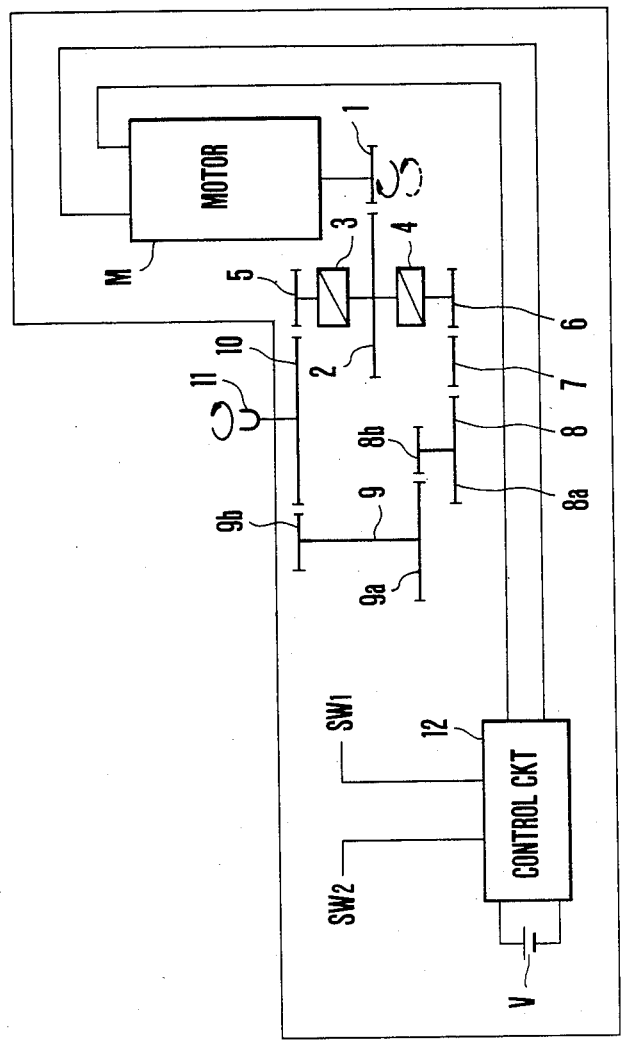
FIG. 1 is a circuit diagram showing the internal arrangement of a motor drive device arranged according to the present invention in an embodiment thereof.
Figure 3:
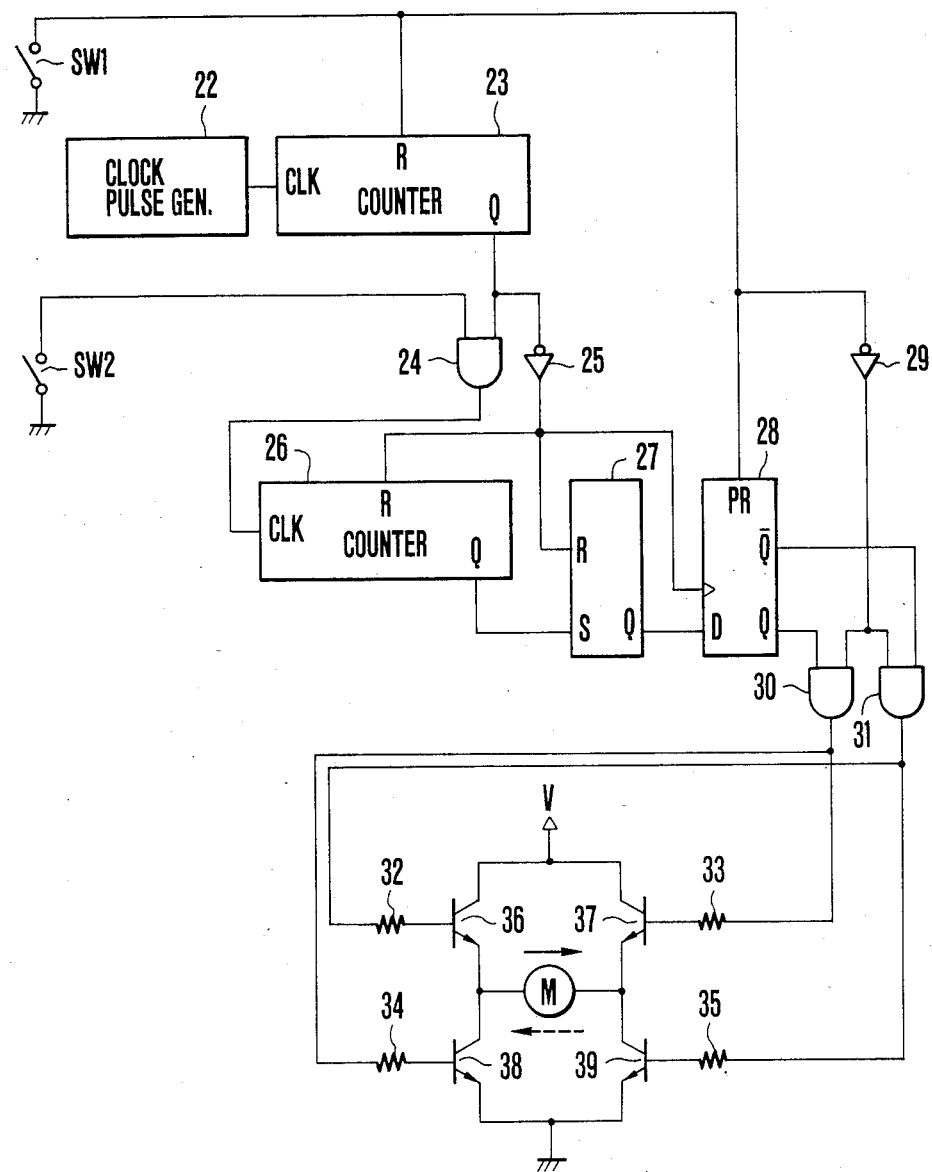
FIG. 3 is a circuit diagram showing a control circuit which controls the rotating direction of a motor.

FIGS. 1, 2 and 3 show a motor driven winding device arranged according to this invention. The internal arrangement of the motor driven winding device is shown in FIG. 1. FIG. 2 shows, in an exploded view, a one-way clutch, etc. which are shown in FIG. 1. FIG. 3 shows, in a circuit diagram, a control circuit to control the rotating direction of the motor shown in FIG. 1. Referring to FIG. 1, the diagram includes the motor M; a first gear 1 secured to the shaft of the motor M; a second gear 2 to engage the first gear 1 and to be coupled with two pairs of one-way clutches 3 and 4, which are arranged as shown in FIG. 2 and which will be described later herein in further detail; a third gear 5 which is coupled with the first one-way clutch 3; a fourth gear 6 which is coupled with the second one-way clutch 4; a fifth gear 7 which engages the fourth gear 6 and a sixth gear 8; the sixth gear 8 which is a double gear consisting of a first gear part 8a which engages the fifth gear 7 and a second gear part 8b which engages a seventh gear 9; and the seventh gear 9 which is a double gear consisting of a first gear part 9a which engages the sixth gear 8 and a second gear part 9b which engages a winding gear 10. The winding gear 10 engages both the seventh gear 9 and the third gear 5. A winding coupler 11 is mounted on the upper part of the winding gear 10. Furthermore, the winding coupler 11 is connected to the winding mechanism of the camera, which is not shown. A motor control circuit 12 controls the motor M as shown in detail in FIG. 3. A reference symbol V identifies a power source.

Referring to FIG. 2, the second gear 2 is provided with a cylindrical part 2a which is formed in the upper part of the second gear 2 and holes 2b which are formed in the middle of the gear 2. Screws 13 pierce the holes 2b to be screwed into hole parts 14a of an inner ring cam 14 and thus join the second gear 2 and the inner ring cam 14 into one unified body. The third gear 5 is provided with a flange part 5a and holes 5b in the lower part thereof. Screws 15 pierce the holes 5b and are screwed into hole parts 16a of an inner ring cam 16 to join the third gear 5 and the inner ring cam 16 into one unified body. The fourth gear 6 is provided with a cylindrical part 6a in the upper part thereof. Rollers 17 of the inner ring cam 14 of the second one-way clutch 4 oppose the inner circumferential face of the cylindrical part 6a. Rollers 8 of the first one-way clutch 3 likewise oppose the inner circumferential face of the cylindrical part 2a of the second gear 2. The first one-way clutch 3 is thus composed of the inner ring cam 16, the rollers 18, springs 19 and the cylindrical part 2a and is disposed between the third gear 5 and the second gear 2, as shown in FIG. 1. The second one-way clutch 4 is composed of the inner ring cam 14, the rollers 17, springs 20 and the cylindrical part 6a and is disposed between the fourth gear 6 and the second gear 2, as shown in FIG. 1.

Referring to FIG. 3, a switch SW1 turns on upon completion of camera photography and turns off upon completion of film winding. A switch SW2 consists of contact pieces 40 and 41, as shown in FIG. 4, with a pin 42 attached to the contact piece 40. The switch SW2 repeatedly turns on and off as the pin 42 moves up and down, guided by crests and bottoms of a wave shape formed along the upper face of a sprocket 21 which is disposed on the side of the camera body. In other words, the switch SW2 generates pulses by repeatedly turning on and off while the film is being wound up. Although FIG. 4 does not show many crests and bottoms of the wave shape of the upper face of the sprocket 21, the number of crests and bottoms is, for example, preferably 100 or thereabouts. A clock pulse generator 22 generates clock pulses. A counter 23 counts the clock pulses of the clock pulse generator 22 when the switch SW1 turns on and produces a high level signal after a predetermined number of clock pulses are counted. The high level signal is produced over a predetermined period of time which is greater than the length of time after a counter 26, which will be described later, completes counting a predetermined number of the pulses generated by the switch SW2 and before the counter 26 begins to produce a high level signal when the motor M has a rotating speed higher than some reference speed. The control circuit includes an AND gate 24; an inverter 25; and the counter 26 which produces a high level signal after counting a predetermined number of pulses generated by the switch SW2. The predetermined count number is set at a value equal to a number of pulses to be generated by the switch SW2 while the signal produced by the counter 23 is at a high level when the rotation speed, i.e. the film winding speed, of the motor M is at the reference speed. For example, assuming that the switch SW2 generates 100 pulses when one frame portion of film is wound up at a standard film winding rate which is 0.2 sec. per frame, the predetermined length of time during which the output level of the counter 23 becomes high is set at 0.01 sec. and the predetermined count number of the counter 26 is 5. The control circuit 12 further includes an RS flip-flop 27; a D flip-flop 28; an inverter 29; AND gates 30 and 31; resistors 32–35; and transistors 36–39.

The first and second one-way clutches 3 and 4, which are shown in FIGS. 1 and 2, operate as follows: When the motor M rotates normally, that is, rotates in the direction of the arrow indicated by a full line in FIG. 1, the second gear 2 likewise rotates in the direction of arrow A shown in FIG. 2. The inner ring cam 14, which is secured to the second gear 2, also rotates with the gear 2. This brings the rollers 17 in between the tapered parts 14b of the inner ring cam 14 and the inner circumferential part of the cylindrical part 6a of the fourth gear 6. Therefore, the inner ring cam 14 and the fourth gear 6 rotate together. The second and fourth gears 2 and 6 thus rotate together to transmit the driving force of the motor M. In other words, the second one-way clutch 4 assumes a connected condition. Meanwhile, with the second gear 2 rotating in the direction of arrow A, the rollers 18 move between the inner circumference of the cylindrical part 2a and the tapered parts 16b of the inner ring cam 16 in an escaping direction, because the tapered parts 16b are formed in a reverse direction to the tapered parts 14b of the inner ring cam 14. Therefore, the third gear 5 does not rotate while the second gear 2 rotates. In other words, the first one-way clutch 3 is disconnected.

When the motor M reverses rotation, that is, rotates in the direction of the arrow indicated by a broken line in FIG. 1, the second gear 2 rotates in the direction of arrow B as shown in FIG. 2. In this instance, since the second gear 2 rotates in the reverse direction to the rotating direction mentioned in the foregoing, the rollers 17 in this instance move in an escaping direction between the tapered parts 14b of the inner ring cam 14 and the cylindrical part 6a. The rollers 18, on the other hand, move in an engaging direction between the inner circumference of the cylindrical part 2a and the inner ring cam 16. Therefore, with the second gear 2 rotating in the direction of the arrow B, the first one-way clutch 3 is connected, causing the second and third gears 2 and 5 to rotate together. The driving force of the motor M is thus transmitted. Meanwhile, the fourth gear 6 does not rotate since the second one-way clutch 4 is disconnected.

With the second, third and fourth gears 2, 5 and 6 and the one-way clutches 3 and 4 coaxially arranged in the manner described above, either the one-way clutch 3 or the clutch 4 is connected and the gear train is switched from one state to the other to transmit the driving force of the motor M based on normal or reverse rotation of the motor M as indicated by the arrows A and B.

The driving force of the motor M derived from the normal rotation thereof is transmitted to the winding gear 10 (and the winding coupler 11) via the low speed (or high torque) gear train which consists of the first and second gears 1 and 2, the second one-way clutch 4, the fourth gear 6, the fifth gear 7, the sixth gear 8 and the seventh gear 9. Meanwhile, the driving force derived from the reverse rotation of the motor M is transmitted to the winding gear 10 (and the winding coupler 11) via the high speed gear train which consists of the first gear 1, the second gear 2, the first one-way clutch 3 and the third gear 5. This arrangement has been proposed in Japanese Laid-Open Utility Model Application No. SHO 58-10417 and is used for the present invention. In this prior art proposal, the gear ratio is switched over based on the kind of battery (nickel-cadmium battery or manganese battery) mounted on the motor drive device.

Again referring to FIG. 3, the control circuit 12 shown in FIG. 1 operates in the following manner: Upon completion of film winding, i.e. with the switch SW1 turned off, the counter 23 is reset. The D flip-flop 28 is preset and produces a high level signal from its output terminal Q. Since the output of the inverter 29 is at a low level at that time, the outputs of the AND gates 30 and 31 are both at low levels. Therefore, the transistors 36–39 are all off. The film winding motor M is in repose.

Upon completion of photography with the shutter of the camera released, the switch SW1 turns on. The counter 23 is released from the reset state and begins to count the clock pulses produced from the clock pulse generator 22. After a predetermined number of clock pulses are counted, the counter 23 produces a high level signal from the output terminal Q thereof. This releases the RS flip-flop 27 and the counter 26 from their reset states as a low level signal is supplied to their reset terminals R via the inverter 25. The output of the inverter 29 changes into a high level signal. Since the D flip-flop 28 which is released from a preset state is in a set state, the output of the output terminal Q of the flip-flop 28 remains a high level signal. Accordingly, the output of the AND gate 30 becomes a high level signal. The high level signal causes the transistors 37 and 38 to turn on respectively via the resistors 33 and 34. A current then flows through the motor M in the direction of an arrow indicated by a broken line in FIG. 3. The motor M begins to reverse rotation. A film winding operation is then carried out through the gear train of the high speed side. The sprocket 21, which is shown in FIG. 4, begins to rotate.

The rotation of the sprocket 21 causes the switch SW2 to repeatedly turn on and off. The AND gate 24 then allows the pulses generated by the switch SW2 to be supplied to the counter 26 (because the output of the counter 23 is a high level signal). Since the counter 26 has been released from a reset state, the counter 26 begins to count the pulses coming from the AND gate 24. At that time if the rotating speed of the motor M is fast, the counter 26 counts a predetermined number, say, five of the pulses generated by the switch SW2 while the output of the counter 23 is at a high level, that is, while the AND gate 24 is not closed. After counting five pulses, the counter 26 produces a high level signal from the output terminal Q thereof. This high level signal is supplied to a set input terminal S of the RS flip-flop 27. The RS flip-flop 27 is set by this signal. The RS flip-flop 27 then produces a high level signal from the output terminal Q thereof and supplies it to an input terminal D of the D flip-flop 28. With this high level signal received, the output of the D flip-flop 28 remains at a high level when the output of the counter 23 changes into a low level signal and the output level of the inverter 25 becomes high after further counting. At that time, the counter 26 and the RS flip-flop 27 are reset.

With the output of the counter 23 changed to a low level signal, it again becomes a high level signal after the lapse of a predetermined length of time through further counting. This causes the counter 26 to begin to count once again to repeat the above repeated operation. This operation is repeated until the switch SW1 turns off after completion of film winding. In this instance, the D flip-flop 28 continues to produce a high level signal from its output terminal Q. Accordingly, the film is wound up through the high speed gear train.

In the event of a drop in the power supply voltage or retardation of the rotation of the motor M by an increased mechanical load due to low temperature, the control circuit 12 operates as follows: The counter 23 begins to count when the switch SW1 turns on. The output level of the counter 23 becomes high. Then, before the output of the counter 23 becomes low with counting further performed, that is, while the counter 23 continues to produce a high level signal, the switch SW2 turns on and off at longer intervals. Therefore, during this period, the counter 26 is unable to count the predetermined number of pulses, i.e. five pulses, before the output of the counter 23 changes into a low level signal through further counting. Therefore, the output of the counter 26 remains at a low level. The output of the RS flip-flop 27 becomes a low level signal. This low level signal of the RS flip-flop 27 causes the output level of the counter 23 to become low and the output of the inverter 25 to become a high level signal, as mentioned above. Then, the D flip-flop 28 produces a low level signal from its output terminal Q and a high level signal from its output terminal $\overline{Q}$. The output of the AND gate 30 then becomes a low level signal and the output of the AND gate 31 a high level signal. With the output of the AND gate 31 becoming a high level signal, the transistor 36 turns on via the resistor 32 and the transistor 39 turns on via the resistor 35 respectively. Then, a current flows to the motor M in the direction of the arrow indicated by a full line in FIG. 3. The motor M begins to rotate normally. In this instance, since the output terminal $\overline{Q}$ of the D flip-flop 28 continues to produce a high level signal, film winding is carried out through the low speed gear train. Upon completion of film winding, the switch SW1 turns off returning the components of each circuit to their initial states and rotation of the motor M stops.

Referring now to FIG. 1, the actual operation of each of the gears 1,2,5,6,7,8,9, and 10 is as follows: If the internal resistance of the power source battery is small and the load such as film, etc. is light, the control circuit 12 rotates the motor M in the direction of an arrow indicated by the broken line when the switch SW1 turns on. The rotatory driving force of the motor M in reverse rotation is transmitted to the winding coupler 11 via the first gear 1, the second gear 2, the first one-way clutch 3, the third gear 5 and the winding gear 10. The driving force is then transmitted from the winding coupler 11 to the camera body. In this instance, the second one-way clutch 4 is disconnected so no rotating force is transmitted to the fourth gear 6. Under this condition, the film is wound up at a high speed. Therefore, the switch SW2 turns on and off at short time intervals.

In the event of a drop in the power source V voltage, an increase in the internal resistance of the battery due to a low temperature or an increase in the load imposed by the film, the embodiment operates as follows: With the switch SW1 turned on, the control circuit 12 rotates the motor M in the direction of the arrow indicated by the full line. With the motor M rotating in this direction, the first and second gears 1 and 2 rotate. The second one-way clutch 4 is connected. The driving force of the motor M is transmitted to the fourth gear 6. In this instance, the first one-way clutch 3 is disconnected and no driving force is transmitted to the third gear 5. Therefore, the rotatory driving force derived from normal rotation of the motor M is transmitted to the winding coupler 11 through the following gear train: The first gear 1→the second gear 2→the second one-way clutch 4→the fourth gear 6→the fifth gear 7→the sixth gear 8→the seventh gear 9→the winding gear 10. Then the winding coupler 11 transmits this driving force to the camera body in the same manner as with reverse motor rotation. In this instance, the third gear 5 also rotates. However, since the first one-way clutch 3 is disconnected between the second and third gears 2 and 5, rotation of the third gear 5 does not participate in the driving force transmission. Under this condition, the film winding speed is slow and the switch SW2 turns on and off at longer intervals.

In the above-stated cases, the motor M rotates in different directions. However, since the number of gears of one gear train differs from the number of gears of the other gear train, the rotatory driving force is transmitted to the camera body in the same rotating direction in all the cases mentioned above.

In this embodiment, the reduction ratio of the gear train is selected based on the load condition and the power source condition of the camera. One reduction ratio shortens the film winding time. The other reduction ratio permits an increase in the number of film rolls which can be fed or permits film winding at low temperatures. In other words, the high speed gear train (including the first one-way clutch 3) which shortens film winding time is selected when there is a sufficient allowance in the power source V or in the winding load. The low speed gear train (including the second one-way clutch 4) which requires a longer film winding time is selected when there is no sufficient allowance in the power source V or in the winding load. Selection of the high speed gear train or the low speed gear train is accomplished by switching one rotating direction of the motor M to the other. The switch-over between the rotating directions of the motor M is automatically accomplished by means of a signal representing the film winding speed, that is, according to how many pulses are generated by the switch SW2 while the counter 23 is producing a high level signal. Therefore, the embodiment has a great advantage.

In this specific embodiment, the switch SW2, the clock pulse generator 22, the counter 23, the AND gate 24, the inverter 25, the counter 26 and the RS flip-flop 27 correspond to the detecting means of this invention. The D flip-flop 28, the inverter 29, the AND gates 30 and 31, the resistors 32–35 and the transistors 36–39 correspond to the switch-over control means of the invention. The fourth gear 6, the one-way clutch 3, the fifth gear 7, the sixth gear 8, the seventh gear 9 and the winding gear 10 correspond to one driving gear train while the one-way clutch 4, the third gear 5 and the winding gear 10 correspond to another driving gear train. Furthermore, in this embodiment, one gear train is switched over to the other gear train by means of the one-way clutches 3 and 4. However, this switch-over arrangement may be replaced with some planet gear arrangement. Furthermore, the switch SW2 which repeatedly turns on and off in association with film winding is formed by the two contact pieces 40 and 41, the pin 42, etc. However, this switch arrangement may be replaced with some photoelectric conversion arrangement using a photo-interrupter or with an arrangement to generate a signal by magneto-electric conversion using some hall element or the like. The arrangement to detect the rotating speed of the motor M at the sprocket 21 may be replaced with an arrangement to detect it at a rotating part of the motor M. The latter arrangement permits use of various film driving methods, such as a sprocket driving method, a spool driving method, etc.

In this embodiment, the invention is applied to film winding. However, the invention is not limited to that but is also applicable to other purposes, such as film rewinding, or an electric charging operation on a charge member of a camera.

In accordance with this invention, as has been described in the foregoing, there are provided detecting means for detecting a signal corresponding to the rotating speed of the motor M; and switch-over control means for controlling switch-over between normal and reverse rotations of the motor M. When the rotating speed of the motor M becomes slow, the rotating direction of the motor M is switched over from one direction to the other to select thereby a driving gear train having a transmission gear ratio for a lower speed. Therefore, the optimum transmission gear ratio can be automatically selected from the high and low speed gear ratios based on the operating conditions.

What is claimed is:

1. A film feeding device for a camera which drives a film feeding member with a driving force of an electric motor for effecting the feeding of a film, comprising:
    (a) a driving mechanism for driving said film feeding member with the driving force of said motor, said mechanism having a first state of driving the film feeding member at a high speed and a second state of driving the film feeding member at a speed slower than the speed in the first state, and at the same time having selecting means for selecting the first state or the second state;
    (b) a sprocket engaging with perforations of the film for effecting the film feeding by said feeding member, thus being rotated;
    (c) means for detecting the rotating speed of said sprocket; and
    (d) a determining circuit for determining a selecting state for the first state and the second state by said selecting means based on the rotating speed of the sprocket in response to an output of said detecting means.

2. A film feeding device for a camera according to claim 1, wherein said determining circuit has the selecting means select the first state when the rotating speed of the sprocket is detected by the detecting means as being higher than the prescribed rotating speed and has said selecting means select the second state when said speed is detected as lower than the prescribed speed.

3. A film feeding device for a camera which drives a film feeding member with a driving force of an electric motor for effecting the feeding of a film, comprising:
    (a) a driving mechanism for driving said film feeding member with the driving force of said motor, said mechanism having a first state of driving the film feeding member at a high speed and a second state of driving the film feeding member at a speed slower than the speed in the first state, and at the same time having selecting means for selecting the first state or the second state;
    (b) means for detecting a film feeding speed at which the film is fed; and
    (c) a determining circuit for determining the selecting state of the first and the second states by said selecting means in response to an output of said detecting means.

4. A film feeding device for a camera according to claim 3, wherein said determining circuit has the selecting means select the first state when the feeding speed of the film is detected by the detecting means as higher than the prescribed feeding speed and has said selecting means select the second state when said speed is detected as lower than the prescribed speed.

5. A film feeding device for a camera according to claim 1 or 2, wherein said driving mechanism can selectively change over a change gear ratio by the selecting means into different values between the first state and the second state.

6. A film feeding device for a camera according to claim 1 or 2, wherein said film feeding device can change over the rotating direction of the motor by said determining circuit based on the rotating speed of the sprocket, and at the same time said selecting means selects the first state or the second state of the driving mechanism depending on said rotating direction.

7. A film feeding device for a camera which drives a film feeding member with a driving force of an electric motor for effecting the feeding of a film, comprising:
  (a) a driving mechanism for driving said film feeding member with the driving force of said motor, said driving mechanism having a first mode for driving the film feeding member at a high speed and a second mode for driving the film feeding member at a speed slower than the speed in the first mode;
  (b) a sprocket engaging with perforations of the film for effecting the film feeding by said feeding member, thus being rotated;
  (c) means for detecting the rotating speed of said sprocket; and
  (d) a control circuit for rotating the motor to a first direction when a high speed rotation is detected based on an output of the detecting means and rotating the motor to a second direction which is reverse to the first direction when a low speed rotation is detected, wherein said driving mechanism takes said first mode as the motor rotates to the first direction and takes the second mode as the motor rotates to the second direction.

8. A film feeding device for a camera which drives a film feeding member with a driving force of an electric motor for effecting the feeding of a film, comprising:
  (a) a driving mechanism for driving said film feeding member with the driving force of said motor, said mechanism having a first state of driving the film feeding member at a high speed and a second state of driving the film feeding member at a speed slower than the speed in the first state, and at the same time having selecting means for selecting the first state or the second state;
  (b) pulse forming means for detecting the feeding speed of the film thus forming pulses of such frequency as corresponding to the feeding speed; and
  (c) discriminating means for detecting the pulses from said pulse forming means and providing a first output when the number of pulses formed by the pulse forming means within a predetermined period of time has a prescribed value or higher and providing a second output when said number of pulses has a value lower than said prescribed value, wherein said selecting means selects the first state or the second state depending on an output state from said discriminating means.

9. A film feeding device for a camera according to claim 8, wherein said pulse forming means is switch means which engages with perforations of the film and is turned on or turned off by the rotation of a sprocket being rotated by the film feeding with said film feeding member.

* * * * *